March 27, 1951     W. M. GAMBILL     2,546,437
CASTING LURE
Filed Nov. 19, 1946
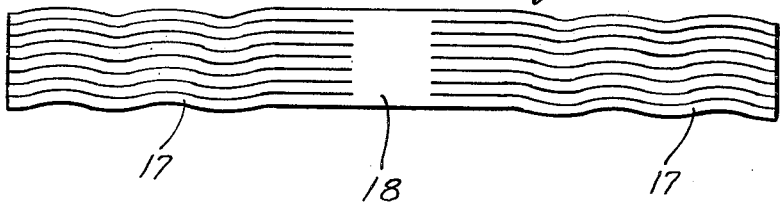
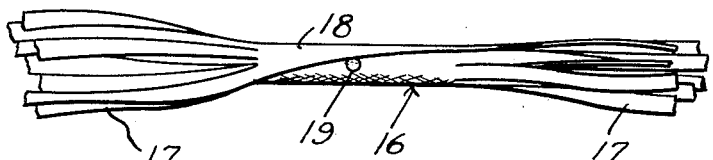
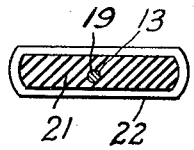
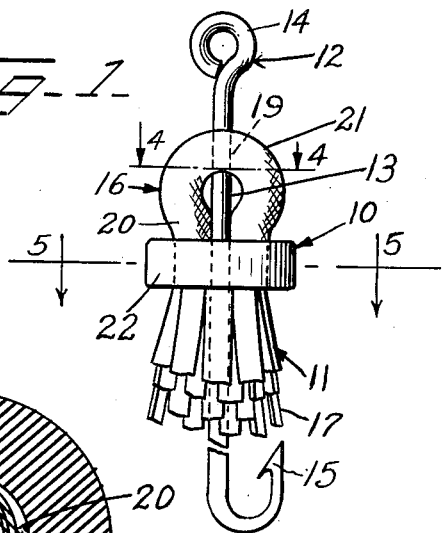
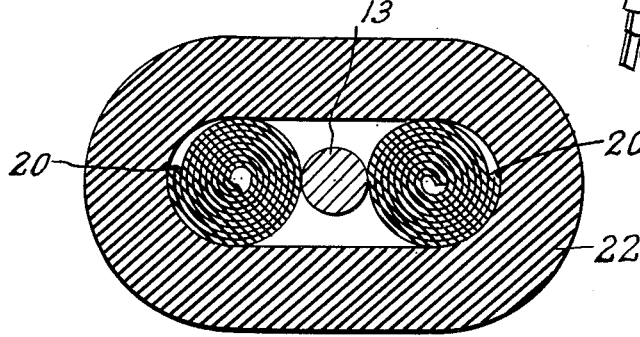
Inventor
W. M. Gambill
By Kimmel & Crowell
Attorneys Patented Mar. 27, 1951

2,546,437

UNITED STATES PATENT OFFICE 2,546,437

CASTING LURE

William M. Gambill, Abilene, Tex.

Application November 19, 1946, Serial No. 710,807

2 Claims. (Cl. 43—42.28)

This invention relates to fish lures.

An object of this invention is to provide a fish lure formed with a rubber skirt which is so constructed and arranged as to provide increased movement or agitation to the lure as it moves relative to the water.

Another object of this invention is to provide an improved rubber skirt or streamer for a lure having a hook wherein the skirt is formed of overlapping body portions which are secured to the shank of the hook, the skirt also including longitudinally curved streamers which in moving through the water will be agitated in a greater manner than straight steamers.

With the above and other objects in view, my invention consists in the arrangement, combination and details of construction disclosed in the drawing and specification, and then more particularly pointed out in the appended claims.

In the drawing:

Figure 1 is an elevational view of a casting lure constructed according to this invention with the streamers thereof partially fragmentated, Figure 2 is a plan view of a blank for the skirt and streamers, Figure 3 is a plan view of the blank in its rolled condition from which the skirt and streamers are formed, Figure 4 is a transverse section taken on line 4—4 of Figure 1, Figure 5 is a transverse enlarged section taken on line 5—5 of Figure 1.

Referring to the drawing, the numeral 10 designates generally the casting lure device of this invention comprised of a body or tail section 11 and a hook 12. The device 10 is formed with the tail section 11 disposed on a hook 12 and is adapted for being drawn through the water at the end of a fishing line (not shown). Hook 12 is of conventional type having a shank 13 formed with an eye portion or attaching portion 14 at one end and a barb 15 at the opposite end.

The tail section 11 is preferably formed of rubber or elastic material and may be made from a blank 16, as shown in Figure 2. The blank 16 is formed as a flat elongated strip of rubber-like material, cut inwardly from the outer edges toward the center in reverse arcuate sections to provide wave-like streamers 17 which extend outwardly at each side from a flat central portion 18. Blank 16 is then rolled transversely upon itself as best illustrated in Figure 2. A transversely disposed hole is formed through the rolled blank centrally of the center section 18 as at 19 through which the hook 12 is longitudinally pulled until the center portion 18 reaches a point on shank 13 near the upper end thereof and adjacent the eye portion 14 as shown in Figure 1.

The rolled tail section 11 is then folded to each side and downwardly of the shank 13 to form the rolled center section 18 as an inverted U-shaped section 20 having a bight portion 21 disposed on the shank so as to form a skirt with streamers 17 dependently hanging therefrom and around the hook to cover and conceal the lower or barbed end 15.

In Figure 1 the streamers 17 are shown cut short or fragmentated for purposes of illustration, however, it is to be understood that they should be formed of sufficient length to extend below the hook barb 15 when mounted on shank 13 as shown. A small rubber cord or band 22 is placed to encircle the section 20 below the bight portion 21 for frictionally securing the tail section 11 to the hook 12.

It is understood that one or more of the blanks 16 may be rolled together before folding to provide for a larger number of streamers 17 on the hook, and certain of the streamers may be of a shorter length than those of other blanks.

Streamers 17, having a wavy configuration, provide a wiggling effect on the lure that simulates the movement of a minnow or other small fish as the lure is drawn through the water in casting or trolling.

It is to be understood that the rubber skirt of this invention may be manufactured and sold independently of the hook and may be attached to other types of fish lures and rubber cement or other cementitious material may be used for fastening a number of the skirts together.

What I claim is:

1. In a fish lure, a tail section for concealing a hook comprising a flexible inverted U-shaped center skirt portion being in the form of a roll and streamers extending from the opposite ends of said skirt, said skirt portion being formed with a central opening through which the shank of the hook is adapted to be passed, and a flexible member about said opposite ends and said shank for securing said streamers in hook concealing position.

2. In a fish lure having a hook formed with a shank and a barb; a tail section for concealing the hook comprising a U-shaped flexible center skirt portion being in the form of a roll, a plurality of longitudinally waved elongated streamers extending from each of the opposite ends of said rolled skirt portion, an opening formed through the bight of said skirt portion adapted to receive the hook shank therein with said opposite ends extending in the direction of the barb, and a resilient member engaging about said opposite ends and the shank for securing said streamers in hook concealing position.

WILLIAM M. GAMBILL.

REFERENCES CITED

The following references are of record in the file of this patent:

UNITED STATES PATENTS

| Number | Name | Date |
|---|---|---|
| 1,338,424 | Cooney | Apr. 27, 1920 |
| 1,451,436 | Barnia | Apr. 16, 1923 |
| 1,698,736 | Roberts | Jan. 15, 1929 |
| 1,813,722 | Wright et al. | July 7, 1931 |
| 1,836,650 | Davenport | Dec. 15, 1931 |
| 1,851,529 | Stapf | Mar. 29, 1932 |
| 1,976,695 | Boehm | Oct. 9, 1934 |
| 2,161,094 | Saunders | June 6, 1939 |
| 2,208,827 | Accetta | July 23, 1940 |
| 2,235,597 | Winter | Mar. 18, 1941 |
| 2,238,292 | Schavey | Apr. 15, 1941 |
| 2,340,569 | Setnicka | Feb. 1, 1944 |
| 2,386,105 | Gambill | Oct. 2, 1945 |
| 2,413,344 | Willman | Dec. 31, 1946 |

FOREIGN PATENTS

| Number | Country | Date |
|---|---|---|
| 454,804 | Great Britain | Oct. 8, 1936 |